(No Model.)
J. G. DAVIS.
CLOTHES POUNDER.
No. 474,223. Patented May 3, 1892.
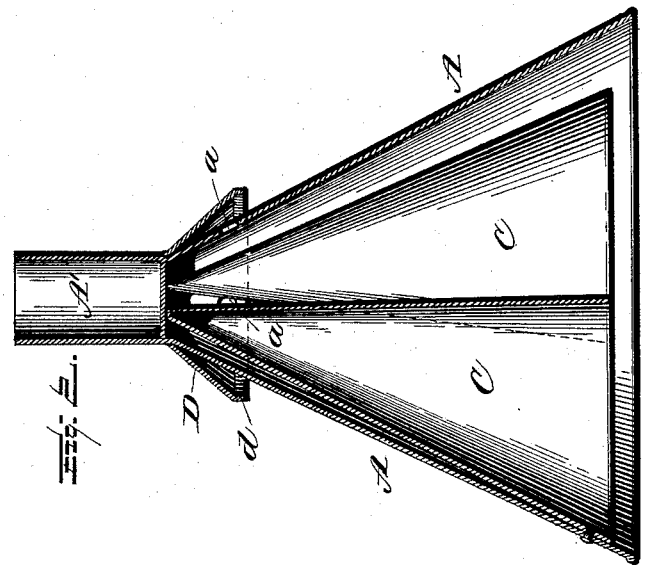
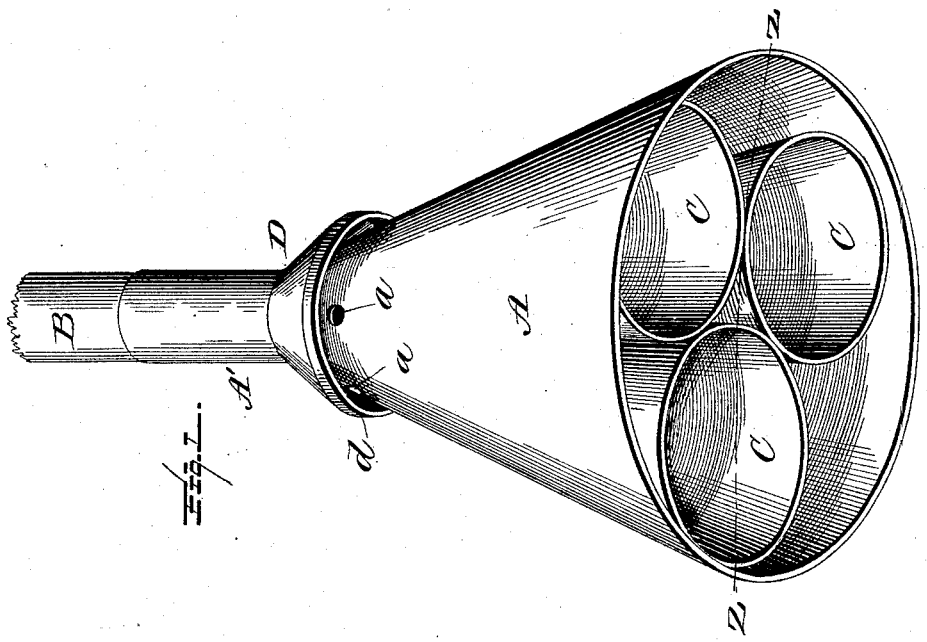
Witnesses
L. C. Hills
E. A. Bond
Inventor
Jordan G. Davis,
per Chas. H. Fowler
Attorney

United States Patent Office.

JORDAN G. DAVIS, OF WACO, TEXAS.

CLOTHES-POUNDER.

SPECIFICATION forming part of Letters Patent No. 474,223, dated May 3, 1892.

Application filed November 5, 1891. Serial No. 410,992. (No model.)

*To all whom it may concern:*

Be it known that I, JORDAN G. DAVIS, a citizen of the United States, residing at Waco, in the county of McLennan and State of Texas, have invented certain new and useful Improvements in Clothes-Pounders; and I do hereby declare that the following is a full, clear, and exact description of the same, reference being had to the annexed drawings, making a part of this specification, and to the letters of reference marked thereon.

This invention relates to certain new and useful improvements in clothes-pounders; and it has for its objects, among others, to provide an improved, cheap, and durable pounder, by the use of which better results can be obtained with less labor.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1 is a perspective view of my improved pounder. Fig. 2 is a longitudinal section of the same through the line $zz$ of Fig. 1.

Like letters of reference indicate like parts in both of the views.

Referring now to the details of the drawings by letter, A designates the outer cone, which is provided near its upper end with holes $a$ for the escape of the air and water during the operation of the device. This cone is provided with a socket A' at its apex, which is slightly truncated for this purpose as seen in Fig. 2, and this socket is designed to receive and hold a handle, as B. Within the outer cone A there is arranged a plurality of smaller cones C, preferably three in number, as shown, the cones being so proportioned relatively to the outer cone that at their lower ends they will contact with the inner wall of the said outer cone, as seen in both views, and their upper ends being secured to the outer cone at the bottom of the socket, as seen in Fig. 2. They may be secured in any suitable manner. The inner cones are arranged in the form of a triangle, as seen best in Fig. 1, thus leaving a space between the three cones and between each cone and the inner wall of the outer cone, as seen in Fig. 1. The inner cones may be secured together at their lower ends if found necessary or desirable.

In order to prevent splashing of the water upon the operator when using the pounder, I provide a guard D, which consists of a surrounding conical part secured at its upper end to the outer cone or the socket thereof and extended outward therefrom at its lower edge, terminating in a substantially vertical flange $d$, which extends somewhat below the openings in the upper end of the outer cone.

The operation will be readily understood. The downward stroke of the pounder forces the water up the inclined sides of the cones, the downward stroke bringing the water up, while the upward stroke creates a suction. The water and air escapes through the holes at the upper end of the outer cone. I obtain an extended operating or acting surface.

The device is simple, strong, and in practice has proved most efficient for the purpose for which it is intended.

What I claim as new is—

The herein-described clothes-pounder, consisting of an outer cone with openings and socket near its upper end, a plurality of smaller cones with open bottoms within the outer cone and having their upper ends secured to the bottom of the said socket of the larger cone, and a conical guard around the upper end of the outer cone and extended below said openings independent of the outer cone and terminating in a vertical depending flange at a distance from the said outer cone, substantially as shown and described.

In testimony that I claim the above I have hereunto subscribed my name in the presence of two witnesses.

JORDAN G. DAVIS.

Witnesses:
    W. A. DAVIS,
    E. M. EWING.